INVENTORS
Clyde L. Taylor
William E. Hamel
BY
Attorneys

Feb. 23, 1971     C. L. TAYLOR ET AL     3,564,821
APPARATUS FOR MOWING, CONDITIONING AND WINDROWING FORAGE
Filed April 24, 1968     2 Sheets-Sheet 2

INVENTORS
Clyde L. Taylor
William E. Hamel
BY
Flehr, Hohbach, Test,
Albritton & Herbert
Attorneys

United States Patent Office 3,564,821
Patented Feb. 23, 1971

3,564,821
APPARATUS FOR MOWING, CONDITIONING AND WINDROWING FORAGE
Clyde L. Taylor, 1545 S. Chinoworth St., Visalia, Calif. 93277, and William Ernest Hamel, 718 Madera St., Dos Palos, Calif. 93620
Filed Apr. 24, 1968, Ser. No. 723,783
Int. Cl. A01d 43/10
U.S. Cl. 56—23             9 Claims

ABSTRACT OF THE DISCLOSURE

Apparatus for mowing, conditioning and windrowing forage having an inlet conveyor for moving the forage to one end and conditioning means for picking up the forage from the conveyor and delivering it into a windrower.

BACKGROUND OF THE INVENTION

Apparatus for moving, conditioning and windrowing of forage, often called windrowers, have heretofore been provided. However, this apparatus has not been completely satisfactory because in the past most but not all of the parts were mechanically driven which has caused considerable difficulty. In addition, the apparatus heretofore provided has not had the versatility desired. There is, therefore, a need for a new and improved apparatus for the mowing, conditioning and windrowing of forage.

SUMMARY OF THE INVENTION AND OBJECTS

The apparatus for mowing, conditioning and windrowing of forage consists of a framework. A mower assembly is mounted on the framework and is provided for mowing the crop which is to be turned into forage. An endless conveyor is mounted on the framework and extends longitudinally of the mower assembly. Reel means is provided on the framework for moving the crops to be harvested into the mower assembly and for carrying the crop after it has been mowed onto the conveyor. The conveyor delivers the forage into one end of the framework. A pair of conditioning rollers are carried by the framework and are adapted to pick up the forage after it has been discharged from the conveyor and to condition the same and to deposit the conditioned forage in a windrow.

In general, it is an object of the present invention to provide an apparatus for moving, conditioning and windrowing of forage which in a large part is hydraulically driven.

Another object of the invention is to provide an apparatus of the above character in which the conditioning rollers are relatively small in length in comparison to the length of the conveyor.

Another object of the invention is to provide an apparatus of the above character which can be readily mounted on a self-propelled vehicle.

Another object of the invention is to provide an apparatus of the above character which can be operated with ease.

Additional objects and features of the invention will appear from the following description in which the preferred embodiment is set forth in detail in conjunction with the accompanying drawing.

DESCRIPTION OF THE PREFERRED EMBODIMENT

Figure 1:
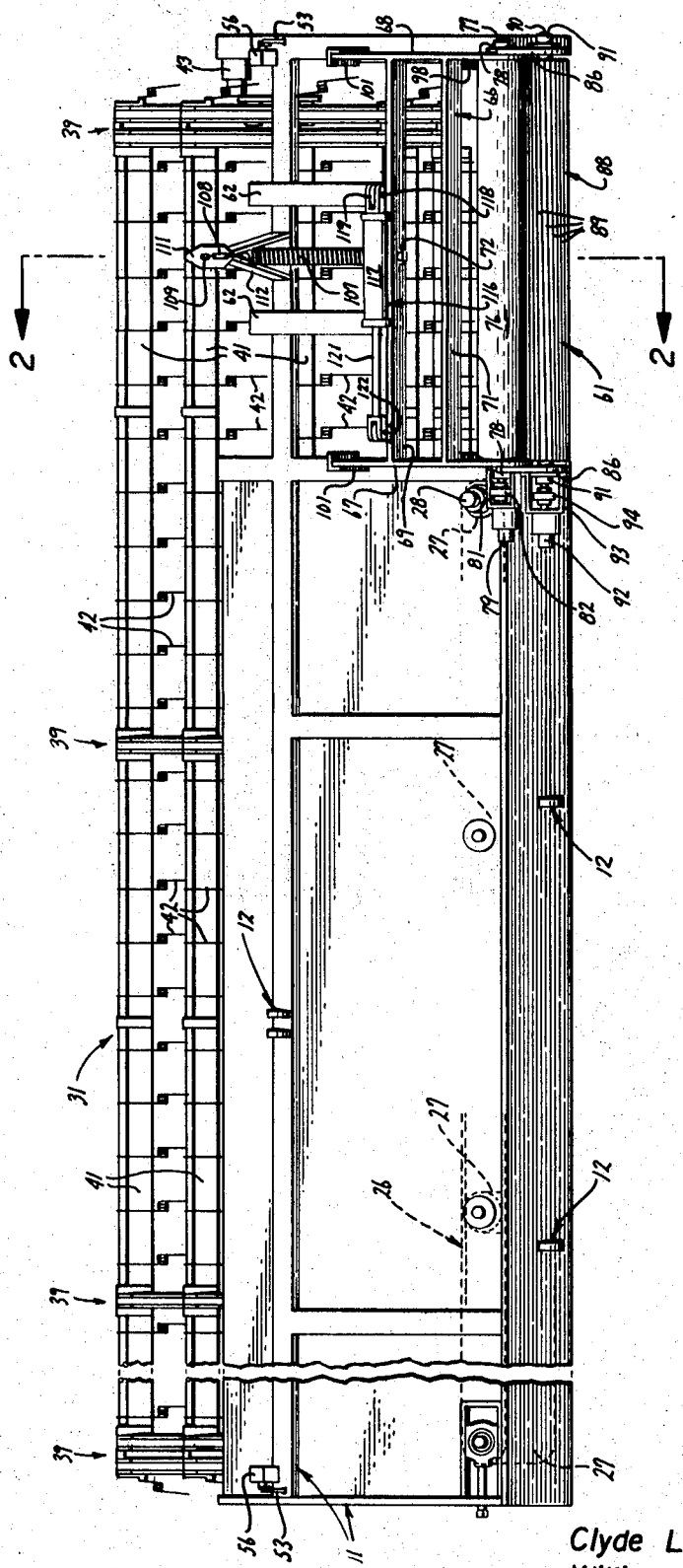
FIG. 1 is a rear elevational view of an apparatus for mowing, conditioning and windrowing of forage which incorporates the presetnt invention.

The apparatus for mowing, conditioning and windrowing forage consists of an elongate framework 11. The framework 11 is provided with a three-point hitch 12 substantially of a conventional type which permits the same to be mounted on the rear of a suitable self-propelled vehicle, such as a wheeled tractor 13 which is provided with rear wheels 14. Since the framework 11 is mounted on the rear of the tractor 13, the tractor 13 is operated so that it moves in a rearward direction.

A mower assembly 16 is mounted on the framework 11 and extends longitudinally of the framework. The mower assembly includes a sickle or cutter bar 17 which travels in guards 18. The sickle 17 is driven by a conventional sickle drive assembly 21 driven by a hydraulic motor 22.

A header board 23 is mounted on framework 11 and extends longitudinally of the framework immediately behind the mower assembly 16 and is provided with an upwardly inclined surface 24 which receives the crop as it is mowed and guides it onto an endless conveyor 26. The endless conveyor 26 is mounted upon a plurality of rollers 27 mounted in the framework and rotating on axes at right angles to the direction of movement of the sickle 17. In addition, the rollers 27 are inclined downwardly in a forward direction so that one side is at the level of the upper portion of the surface 24 of the header board 23. The endless conveyor 26 is driven by a hydraulic motor 28 connected at one end of the conveyor. It will be noted from FIG. 1 that the endless conveyor 26 only extends approximately three-quarters of the length of the framework 11.

Means is provided for moving the forage to be cut into the mower assembly 16 and for advancing the crop after it has been cut onto the conveyor and consists of a reel assembly 31. The reel assembly 31 is generally of a conventional type and includes at each end a plate 32 which is provided with an opening 33 in which travel three rollers 34 carried by another plate 36 affixed to the framework 11. The three rollers 34 engage the circumferential surface in plate 32 and hold plate 32 for rotation about an axis extending longitudinally of the framework 11. Another plate 37 is affixed to a shaft 38 rotatably mounted in bearings (not shown) affixed to the framework 11. The shaft 38 is offset with respect to the axis of rotation for the plates 32. A parallelogram mechanism 39 connects the plates 32 and 37 to battens 41 that extend longitudinally of the framework 11 and which carry a plurality of spaced tines 42. Means is provided for driving the reel assembly 31 and consists of a motor 43 mounted upon a portion of the frame 11 and drives a sprocket 44 which drives a chain 46. The chain 46 drives a large sprocket 47 mounted upon a shaft 48.

Figures 2, 3:
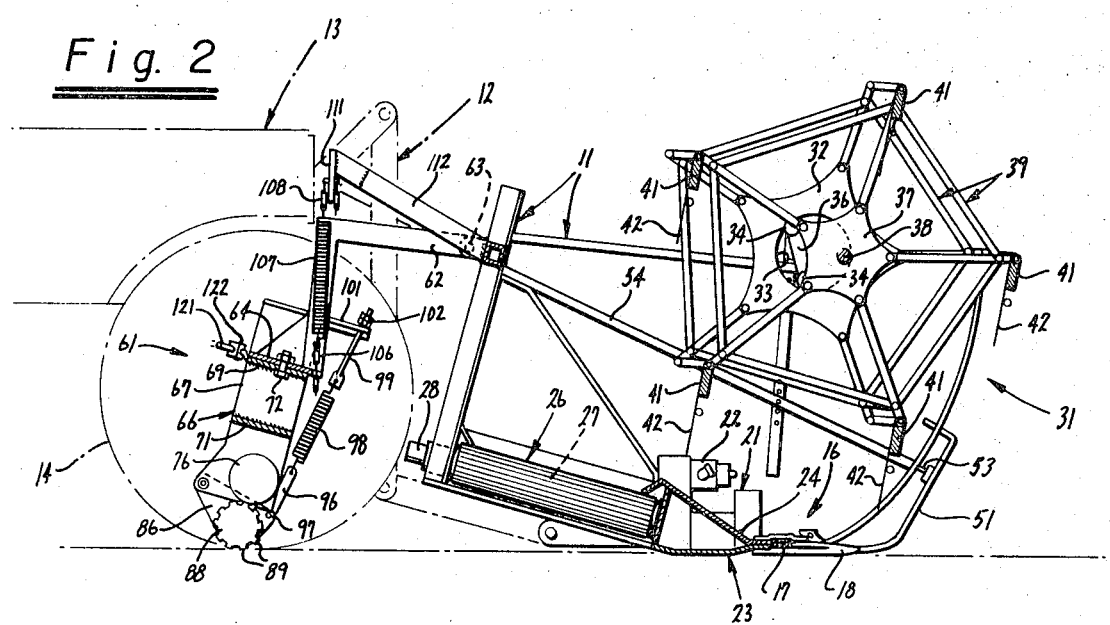
FIG. 2 is a cross-sectional view taken along the line 2—2 of FIG. 1.
FIG. 3 is an end elevational view of the apparatus shown in FIG. 1.

Rotation of shaft 48 and plate 37 by the motor 43 causes the reel assembly to be rotated in a clockwise direction as viewed in FIGS. 2 and 3 so that the battens 41 with the tines 42 depending therefrom extend downwardly to bring the crop in over the mower assembly 16 so that it is cut and then to advance it over the mower assembly on the header board 24 onto the endless conveyor 26. Then, as the battens 41 with the tines 42 are raised, they are moved inwardly into the reel mechanism as shown particularly in FIGS. 2 and 3.

Means is provided for sensing the ground level over which the apparatus travels and consists of a plurality of spaced shoes 51 which are pivotally mounted upon the mower assembly 16 at 52. Each of the shoes 51 is connected to an actuating rod 53 which extends through a tube 54 mounted upon the framework 11. The rod 53 is connected to a hydraulic control valve 56 which is adapted to control the flow of fluid to a hydraulic actuator (not shown) connected between the hitch 12 of the apparatus and the tractor 13 to raise and lower that portion of the apparatus in accordance with the level of the ground which is encountered by the associated shoe 51.

Conditioning means 61 is mounted on one end of the framework 11 and is adapted to pick up the forage which is delivered by the endless conveyor 26 and to press the stems to facilitate drying. The conditioning means 61 consists of a pair of L-shaped members 62 which are pivotally mounted on the framework 11 at one end thereof in spaced apart positions by pins 63. A U-shaped plate 64 is affixed to the lower extremities of the L-shaped member 62 by suitable means such as welding.

The conditioning means 61 also includes a conditioner frame 66 which consists of a pair of spaced vertical members 67 and 68 and a pair of spaced horizontal members 69 and 71. Horizontal members 69 and 71 are secured to the vertical members 67 and 68 intermediate the lower extremities of the same by suitable means such as welding. The conditioning frame 61 is pivotally connected to the U-shaped plate 64 by a large pivot bolt 72. A large relatively smooth conditioning roll 76 formed of a suitable material such as rubber is mounted upon a shaft 77 rotatably mounted in bearings 78 secured to the vertical side members 67 and 68. The shaft 77 is driven by a hyrdaulic motor 79 mounted upon a U-shaped member 81 secured to the vertical side member 67. The shaft of the motor 79 is connected by a flexible coupling 82 to the shaft 77. A pair of hinged plates 86 are pivotally connected to the lower extremities of the vertical side members 67 and 68. A large conditioning roll 88 having corrugations 89 thereon and formed of a suitable material such as steel is mounted upon a shaft 90. The shaft 90 is rotatably mounted in bearings 91 carried by the plates 86. The shaft 90 is driven by a hydraulic motor 92 mounted upon a U-shaped member 93 affixed to one of the plates 86. The shaft of the motor 92 is connected by a flexible coupling 94 to the shaft 90.

Means is provided for yieldably urging the roll 88 into engagement with the roll 76 and consists of links 96 having one end pivotally connected to the plates 86 by pins 97 and having the other end secured to springs 98. The springs 98 are connected to a threaded rod 99 which extends through arms 101 secured to the upper extremities of the vertical side members 67 and 68 and held therein by nuts 102.

Means is provided for supporting the conditioning means 61 and for yieldably limiting the amount of downward travel of the conditioning means. Such means consists of a chain 106 secured to the U-shaped member 64. The chain 106 is connected to a large spring 107 which has its other end connected to chain 108. The chain 108 extends through a notch 109 provided in a plate 111. The plate 111 is carried by an arm 112 secured to the framework 11.

Means is provided for adjusting the angular position of the conditioning frame 66 and consists of a hydraulic actuator 116. The cylinder 117 of the actuator is pivotally connected by a pin 118 to an arm 119 secured to the U-shaped member 64. The piston rod 121 of the actuator 116 is pivotally connected to the upper horizontal plate 69 by a pin 122.

As can be seen from the foregoing, the apparatus is operated hydraulically either by the use of hydraulic motors or by the use of hydraulic actuators. The tractor 13 is provided with a hydraulic pump and storage tank suitable piping which connects the oil under pressure to the hydraulic motors hereinbefore described and two control valves which are utilized for controlling the hydralic actuators. Such piping controls are not shown because such piping controls are conventional and can be readily provided by one skilled in the art.

Operation and use of the apparatus for mowing, conditioning and windrowing may now be described as follows. The apparatus is advanced down the field in which it is desired to cut the crop by operating the tractor 13. The controls on the tractor are operated to place in operation the hydraulic motor 43 which causes rotation of the reel assembly 31. At the same time, the hydraulic motor 22 for the sickle drive assembly 21 is placed in operation as well as the motor 28 for the endless conveyor 26. The motors 79 and 92 for the conditioning rolls 76 and 88 are also placed in operation.

After the motors are all in operation, the apparatus is lowered to the ground by controls provided on the tractor and the tractor advances the apparatus to cut the crop. The forage as it is cut by the mower assembly 16 is moved rearwardly by the reel assembly 31 onto the endless conveyor 26. The conveyor 26 advances toward one end of the framework 11 and discharges it onto the stubble in a windrow.

This windrowed forage is picked up by the conditioning rolls 76 and 88 of the conditioning means 61 to crush the stems and the like and to again deposit the same in a windrow. The windrow which is formed by the conditioning means 61 can be shifted either to the right or the left by the operation of the hydraulic actuator 116 which pivots the conditioning frame 66. Thus, with the apparatus shown, it can be seen that a very wide swath can be cut by the apparatus as, for example, a sixteen or eighteen foot swath without any difficulty, and that the forage can be readily conditioned by conditioning rolls which are relatively short and then placed in a single windrow at one side of the frame where it will not be run over by the tractor as the tractor advances the apparatus.

Since the bottom conditioning roll 88 is hinged with respect to the upper conditioning roll 76, it can be seen that rocks and the like can readily pass through the conditioning means merely by stretching the springs 98 without damaging the conditioning means. It also can be seen that the elevation of the conditioning means relative to the frame 11 can be adjusted by adjusting the position of the chain 108 in the notch 109.

The ground sensing means described senses the contour of the ground and causes the apparatus to follow the contour of the ground so that the crop is cut to a uniform height relative to the ground. The spring 107 permits the conditioning means to follow the contour of the ground so that it always picks up the forage as it is discharged by the endless conveyor.

It is apparent from the foregoing that there has been provided a new and improved apparatus for the mowing, conditioning and windrowing of crops. The apparatus has the advantage in that it can be mounted upon a tractor and supported by the tractor so that it operates in much the same manner as a self-propelled machine. Since it is hydraulically controlled throughout, it can be readily operated by a single operator without difficulty. The hydraulic actuators and hydraulic motors provided are relatively trouble-free and, therefore, help make possible relatively trouble-free operation for the apparatus.

We claim:

1. In apparatus for mowing, conditioning and windrowing of crops, a framework, a mower mounted on the framework for severing the crop, an endless conveyor mounted on the framework and extending longitudinally of the mower assembly to the rear of the mower assembly, reel means mounted on the framework for causing the crop to be carried into the mower assembly and to be moved onto the endless conveyor, said endless conveyor carrying the severed crop in an orientation so that it is discharged onto the ground in a row parallel to the direction of movement of the apparatus, a conditioning assembly mounted on said framework at one end of the same adjacent the point at which the severed crop is discharged from the endless conveyors for picking up from the ground the row of severed crop, said conditioning assembly including a pair of conditioning rolls one of which is adapted to engage the ground, and means for driving said conditioning rolls so that as the apparatus is advanced, the conditioning rolls pick up the severed crop after it has been discharged onto the ground by the conveyor and condition the same and discharges the forage into a windrow at one end of the framework.

2. Apparatus as in claim 1 wherein said conditioning means includes a frame and wherein said conditioning rolls are rotatably mounted in said frame together with means for adjusting the angular position of said frame with respect to said framework to vary the position of the windrow formed by the conditioning means relative to the framework.

3. Apparatus as in claim 1 together with yieldable means permitting vertical movement of the conditioning means so that the conditioning means can follow the contour of the ground over which the apparatus travels.

4. Apparatus as in claim 1 together with separate hydraulic motors for driving each of said conditioning rolls.

5. Apparatus as in claim 1 wherein said frame includes a pair of vertical side members and wherein one of said conditioning rolls is mounted in said pair of side members and wherein said frame also includes a pair of plates pivotally connected to said side members and wherein said other conditioning roll is rotatably mounted in said plates and spring means for yieldably urging said last named conditioning roll into engagement with said first named conditioning roll.

6. Apparatus as in claim 2 wherein said means for adjusting the angular position of said conditioning means relative to said framework includes a hydraulic actuator connected between said frame and said framework to cause movement of said frame with respect to said framework.

7. In apparatus for mowing, conditioning, and windrowing of crops, a framework, a mower mounted on the framework, an endless conveyor mounted on the framework and extending longitudinally of and to the rear of the mower assembly, reel means mounted on the framework for directing the crop into the mower assembly and moving the severed crop onto the endless conveyor, a conditioning assembly mounted at one end of the framework adjacent the end of the conveyor at which the crop is discharged, said conditioning assembly including a support frame, means mounting the support frame for vertical movement with respect to the framework, means yieldably interconnecting the support frame and framework permitting vertical movement of the conditioning assembly for following the contour of the ground over which the apparatus travels, a roll frame mounted below the support frame for pivotal movement about an upright axis, horizontally axised conditioning rolls rotatably mounted on the roll frame, hydraulic motor means on the roll frame to drive said conditioning rolls to pick up crop discharging from the conveyor, condition the crop, and discharge the same into a windrow at said one end of the framework, and hydraulic actuator means connected between the support frame and roll frame to selectively pivot the latter about said upright axis to vary the position of the windrow formed by the conditioning assembly.

8. Apparatus as claim 7 wherein said means mounting said support frame to the framework includes support means extending upwardly from the support frame in overlaying relationship with said framework and means pivotally connecting said arm means with said framework, and wherein said means yieldably interconnecting the support frame and framework includes arm means mounted on the framework and overlying the conditioning apparatus and spring means connected between the distal end of the arm means and the support frame.

9. Apparatus as in claim 8 wherein said support means includes a plurality of laterally spaced L-shaped members, each member being connected at one end with the support frame and at its other rearwardly extending end with said pivotal connecting means, and said spring means includes means to adjustably vary the vertical displacement of the support frame with respect to the arm means to selectively vary the elevation of the conditioning rolls with respect to the ground over which the apparatus travels.

References Cited

UNITED STATES PATENTS

| 3,038,287 | 6/1962 | Vincent | 56—23 |
| 3,079,742 | 3/1963 | Balzer | 56—23 |

ANTONIO F. GUIDA, Primary Examiner

U.S. Cl. X.R.

56—1